3/9/82 OR 4,319,274

SR

United States Patent [19]

Geluk

[11] 4,319,274

[45] Mar. 9, 1982

[54] METHOD OF RECORDING IMAGE INFORMATION ON THE TARGET OF A SCAN CONVERTER TUBE

[75] Inventor: Ronald J. Geluk, Nootdorp, Netherlands

[73] Assignee: N.V. Optische Industrie De Oude Delft, Netherlands

[21] Appl. No.: 49,341

[22] Filed: Jun. 18, 1979

[30] Foreign Application Priority Data

Jun. 23, 1978 [NL] Netherlands ........................ 7806812

[51] Int. Cl.[3] ......................... H04N 5/02; H04N 5/14

[52] U.S. Cl. .................................... 358/140; 358/223; 358/160

[58] Field of Search ................. 358/223, 140, 83, 160; 315/30, 226

[56] References Cited

U.S. PATENT DOCUMENTS

| | | | |
|---|---|---|---|
| 2,833,958 | 5/1958 | Pensak | 358/140 |
| 4,005,261 | 1/1977 | Sato | 358/83 |
| 4,143,305 | 3/1979 | Gibson | 358/223 |

*Primary Examiner*—Howard Britton

*Attorney, Agent, or Firm*—Louis E. Marn; Elliot M. Olstein

[57] ABSTRACT

A method and apparatus for recording and superimposing image information on the target of a scan converter tube. The image information is supplied in the form of an electric video signal by means whereof the electron beam projected from the cathode of the tube onto the target is modulated so as to form a charge image. The scan converter tube is alternatingly operated in the beam landing mode and in the secondary emission mode respectively.

8 Claims, 2 Drawing Figures

METHOD OF RECORDING IMAGE INFORMATION ON THE TARGET OF A SCAN CONVERTER TUBE

Figure 1:
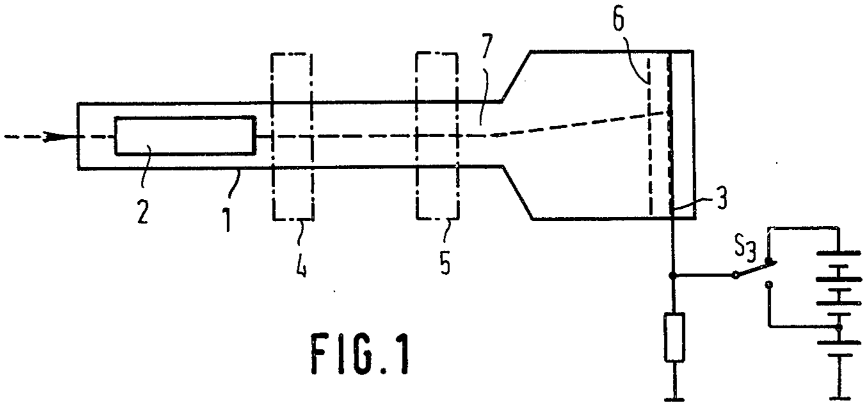

The invention relates to a method of recording and superimposing image information on the target of a scan converter tube, in which the image information is supplied in the form of an electric video signals by means whereof the electron beam projected from the cathode of the tube onto the target is modulated so as to form a charge image.

It is known to write image information on the target of a scan converter tube by means of an electron beam. This image information can remain recorded on the target during a certain period of time to be non-destructively retrieved at a later point of time. It is further known that the writing of the information can be realized in various manners.

A first method is the writing in accordance with the so-called cathode stabilization technique ("equilibrium writing"), in which the points of the target are charged with the instantaneous cathode potential by means of a relatively high beam current. In this method the cathode potential is modulated by an electric signal representing the image information to be recorded. The charge image ultimately formed on the target does not depend on the duration of the writing process.

A second method is the writing in accordance with the so-called beam landing technique. In this method, the beam current is low and the points of the target hit by the electron beam do not attain the instantaneous cathode potential. Moreover, the energy of the incident electrons is low, so that little secondary emission occurs; the secondary emission coefficient is less than 1. This means that the number of electrons arriving at the target exceeds the number of electrons leaving this target as a result of secondary emission. Consequently, the target is imparted a relatively negative charge.

A third writing method is the so-called secondary emission method, in which the electrons incident on the target have such a high energy that the number of electrons released by the primary electrons exceeds the number of these incident primary electrons. In this method, no cathode stabilization can occur. The points of the target hit by the electron beam are imparted a relatively positive charge.

When using one of the above methods, it is not readily possible to process signals having positive as well as negative portions. In the second method, for example, to this end a DC voltage signal has to be added that has a value at least equal to the negative peak value of the presented video signal containing the image information. Especially in the event that a number of images should be recorded in superposition, as this is required for example in the back projection of strip images obtained in axial tomography, this results in an undesirable increase in the charge value of the target and a relatively slight modulation depth of the charge image. Such a slight modulation depth results in turn in a relatively low signal-to-noise ratio. Furthermore, the process of superimposing charge images requires the use of a relatively small initial amplitude of the video signals so as to ensure that, after superimposing the charge images corresponding with the video signals, these charge images do not fall outside the operating range of the target. In the described methods, moreover, non-uniformities occurring when recording a charge image due to, for example, imperfections in the target, become increasingly manifest when superimposing a plurality of images, especially in the event of the aforesaid slight modulation depth.

It is an object of the invention to eliminate the above drawbacks.

To this end, in accordance with the invention a method of the above type is characterized in that the scan converter tube is alternatingly operated in the beam landing mode and in the secondary emission mode respectively.

The invention will be described in greater detail hereinafter with reference to the accompanying drawing, in which:

FIG. 1 schematically shows a scan converter tube; and

Figure 2:
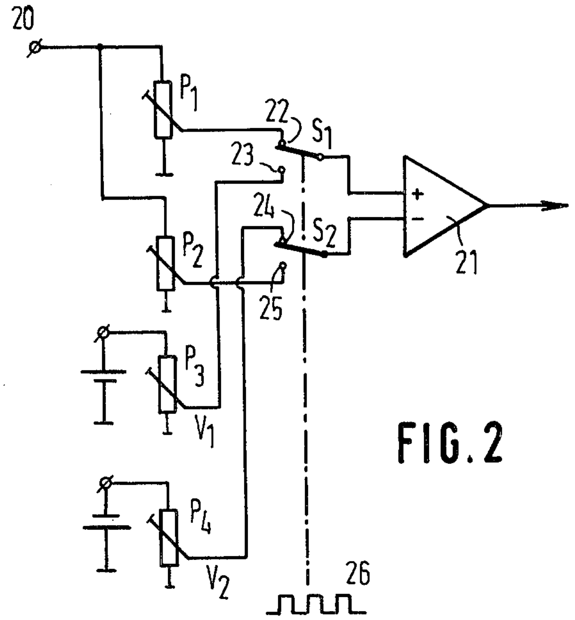

FIG. 2 shows an illustrative example of a fundamental arrangement for performing the method according to the invention.

FIG. 1 schematically shows a scan converter tube including an envelope 1, an electron gun 2 and a target 3. The tube further includes a focus coil 4 and a deflection yoke 5. A collector 6 is provided for preventing the formation of space charge, which collector is adapted to capture secondary electrons. Such tubes are generally known, so that a more detailed description of the structure and operation of the tube may be dispensed with.

It is further known that image information can be recorded on the target by means of an electron beam 7 emanating from the cathode, which beam 7 scans the target under the control of the suitably energized deflection yoke. In the event of the electrons having relatively low energy when arriving at the target, this target is charged in a negative direction. However, in the event of the electrons having relatively high energy, the incident electrons release secondary electrons to such an extent that the number of released secondary electrons exceeds the number of incident primary electrons. In that case, the target is charged in a positive direction.

In accordance with the invention, these effects are used when superimposing a plurality of charge images on the target of the scan converter tube to eliminate or minimize the DC voltage level of the charge image obtained after the superimposing process.

To this end, for example, when recording the first charge image the scan converter tube is operated in the so-called beam landing mode, whereas when recording the next charge image the tube is operated in the secondary emission mode, while at the same time the polarity of the video signal modulating the electron beam is reversed. This procedure is repeated as the subsequent charge image is recorded in the beam landing mode, etc.

In this manner and with suitably selected settings, the DC voltage levels of successive images offset each other, so that the effective potential range of the scan converter tube is practically entirely available for recording image information.

Other advantages of the method described are that a greater depth of the modulation of the video signal applied to the electron gun is possible, which helps to achieve a better signal-to-noise ratio. Furthermore, effects that may occur during the writing of the charge image due to minor imperfections of the tube are reduced.

FIG. 2 shows a fundamental diagram of an illustrative embodiment of a circuit arrangement by means whereof a scan converter tube may be operated in accordance with the method according to the invention. The video signal containing the image information is applied to input terminal 20. This terminal 20 is connected to potentiometers P1 and P2. The slider of potentiometer P1 is connected to the back contact 22 of a two-way switch S1. The throw-over contact of S1 is connected to the positive input of a differential amplifier 21. The slider of potentiometer P2 is connected to the front contact 25 of a two-way switch S2, whose throw-over contact is connected to the negative input of differential amplifier 21.

Furthermore, by means of a potentiometer P3 a positive bias voltage V1 is applied to the front contact 23 of the two-way switch S1, while by means of a potentiometer P4 a negative bias voltage V2 is applied to the back contact 24 of two-way switch S2. The absolute values of the bias voltages are not equal in general, as when operating the scan converter tube in the secondary emission mode a certain amplification may occur.

The potentiometers P1 through P4 provide the setting possibilities that are essential for use in practice. The values of voltages V1 and V2 depend upon the characteristics of the scan converter tube used.

The two-way switches S1 and S2 are concurrently switched in response to a pulse signal 26 that may be derived, for example, from the video signal. In practice, the two-way switches S1 and S2 are preferably electronic switches lacking moving components.

Concurrently with the switching of two-way switches S1 and S2, in so far as necessary the supply voltages of the scan converter tube are switched too between the values required for the beam landing mode and those required for the secondary emission mode. This is schematically shown in FIG. 1 by means of a two-way switch S3, which is likewise responsive to the pulse signal 26 and which provides the target with a relatively high voltage for the secondary emission mode or a lower voltage for the beam landing mode.

The output signal of differential amplifier 21, which signal is used to modulate the beam current of electron gun 2, is a function of $|V2|$ plus the videosignal in the event of tube operation in the beam landing mode, while this output signal of the differential amplifier is a function of $|V1|$ minus the video signal in the event of tube operation in the secondary emission mode.

In accordance with another embodiment of the invention, the DC voltage portion of a charge image recorded on the target of a scan converter tube may be eliminated by each time providing an opposite charge during the retrace of the writing electron beam. To this end, for example, during the recording of the image the scan converter tube is operated in the beam landing mode and during the retrace period the tube is operated in the secondary emission mode, only a voltage that is constant during the retrace period being applied to the electron gun. In this embodiment, consequently, it is not necessary to each time reverse the polarity of the video signal containing the image information. The control signals required for applying the proper bias voltages and the proper supply voltages to the tube at the proper points of time may, for example, be derived from the video signal in a simple and known manner.

It is observed that the fundamental arrangement shown in FIG. 2 represents only one of the possible embodiments of a circuit arrangement for using the method according to the invention. Various other embodiments will be obvious to the worker in the art and are regarded to fall under the scope of the present invention.

I claim:

1. A method of recording and superimposing image information on the target of a scan converter tube in which the image information is supplied in the form of an electrical video signal by means whereof the electron beam projected from the cathode of the tube onto the target is modulated so as to form a charge image, the method comprising the step of operating said scan converter tube alternatingly between a beam landing mode and a secondary emission mode.

2. The method as defined in claim 1 wherein operation of said scan converter tube in one of said modes is effected during recording of said change image and operation of said scan converter tube in said other mode is effected during retracing of said electron beam.

3. The method as defined in claim 1 wherein operation of said scan converter tube in one of said modes is effected during recording of a first charge image and operation of said scan converter tube in said other of said modes is effected during recording of a charge image to be superimposed on said first charge image.

4. The method as defined in claim 3 and further comprising the steps of:

applying said video signal on to said target while having a first polarity and being added to a first bias voltage during operation of said scan converter tube in said one mode; and applying said video signal to said target while having a polarity opposite to said first polarity and and being added to a second bias voltage during operation of said scan converter tube in said other of said modes.

5. The method as defined in claim 1, 2, 3 or 4 and further comprising the step of switching said scan converter tube from said one mode to said other of said modes in response to a pulse signal derived from said video signal.

6. The method as defined in claim 5 further comprising the step of reversing said bias voltages and reversing said polarity of said video signal in response to said pulse signal.

7. An apparatus for recording and superimposing image information on a target of a scan converter tube wherein image information is supplied in the form of an electrical video signal whereby an electron beam projected from a cathode of the tube onto the target is modulated so as to form a charge image, which comprises:

a first and second potentiometer means including a slider to apply said video signal;

a double pole switch having two stationary contacts associated with a first and second pole, a slider of said first potentiometer being electrically connected to one of said stationary contacts of said first pole and the slider of said second potentiometer being simultaneously electrically connected to one of said stationary contacts of said second pole;

means for applying a first bias voltage to the other of said stationary contacts of said first pole through a third potentiometer;

means for applying a second bias voltage to the other of said stationary contacts of said second pole through a fourth potentiometer;

a differential amplifier having positive and negative input terminals, one of said terminals being electrically connected to said first pole of said switch and the other of said terminals being electrically connected to said second pole, said differential amplifier producing an output signal for modulating said electron beam;

means for periodically and concurrently switching said switch in response to a pulse signal derived from said video signal from a first position wherein said first potentiometer slider is connected to said first pole while said fourth potentiometer is connected to said second pole, to a second position wherein said third potentiometer is connected to said first pole while said second potentiometer slider is connected to said second pole.

8. The apparatus according to claim 7 wherein said switch is an electronic switch.

* * * * *